July 26, 1960 T. WEINER 2,946,466
APPARATUS FOR LOADING AND UNLOADING FLOATING VESSELS
Filed Sept. 26, 1958 2 Sheets-Sheet 1

INVENTOR
TED WEINER

BY Cushman, Darby & Cushman
ATTORNEYS

July 26, 1960
T. WEINER
2,946,466
APPARATUS FOR LOADING AND UNLOADING FLOATING VESSELS
Filed Sept. 26, 1958
2 Sheets-Sheet 2
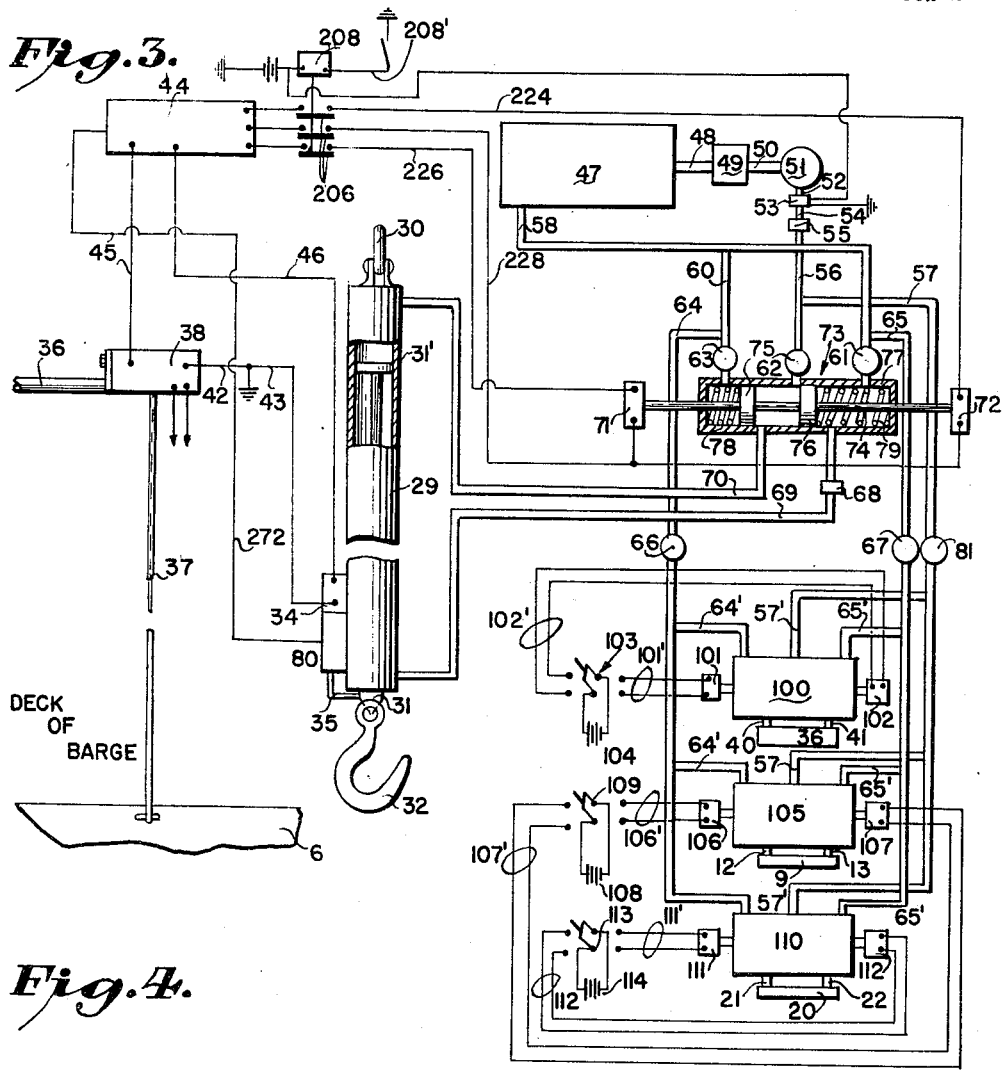
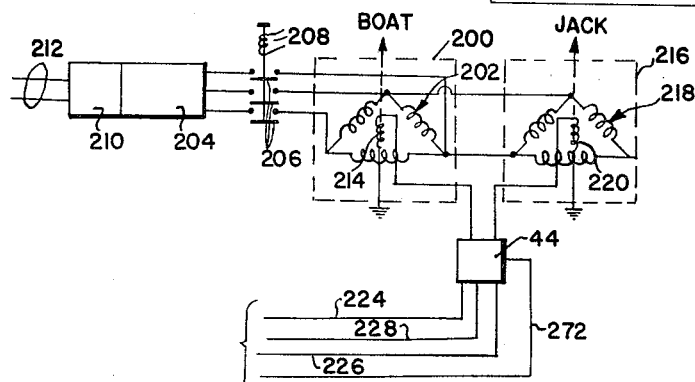
INVENTOR
TED WEINER
BY Cushman, Darby & Cushman
ATTORNEYS

United States Patent Office 2,946,466
Patented July 26, 1960

2,946,466

APPARATUS FOR LOADING AND UNLOADING FLOATING VESSELS

Ted Weiner, Texas Crude Oil Company, 6100 Camp Bowie Blvd., P.O. Box 9846, Fort Worth 7, Tex.

Filed Sept. 26, 1958, Ser. No. 763,539

4 Claims. (Cl. 214—14)

This invention relates to apparatus for loading and unloading articles from a floating vessel, and in particular relates to apparatus wherein movement of means for supporting articles to be loaded or unloaded is synchronized with movement of the vessel.

When a crane, or the like, is used to unload articles from a floating vessel, such as a barge, which is in constant motion because of surface waves, there exists with prior loading and unloading apparatus, a constant danger of damaging the articles to be loaded and unloaded, damaging the vessel, or damaging both the articles and the vessel. For example, an article or articles may be raised by a hoist to a position slightly above the vessel surface while the vessel is on a level water surface, and subsequently a wave may raise the level of the vessel such that the vessel surface contacts the article or articles suspended slightly above the vessel surface, and as a result there is damage to the vessel or article or both.

It is an object of this invention to provide an apparatus for loading and unloading a floating vessel which eliminates the danger above set forth. More specifically, it is an object of this invention to provide a combination of means for supporting articles to be loaded and unloaded from a floating vessel, for moving the supporting means between a vessel loading and unloading position and a remote loading and unloading position and for synchronizing the movement of the supporting means with the movement of the vessel, when the supporting means is in the vessel loading and unloading position, such that there exists no possibility of damage to the articles being loaded and unloaded or to the vessel from which the articles are being loaded or unloaded.

It is a further object of this invention to incorporate within the means for synchronizing movement between the vessel and the means for supporting articles to be loaded thereon or unloaded therefrom, power means, separate from the means for moving the supporting means between vessel loading and unloading position and a remote loading and unloading position, for moving the supporting means when it is positioned in the vessel loading and unloading position.

It is a still further object of this invention to provide a separate power means, as above set forth, which is responsive to an electrical signal and to provide electrical means adapted to be coupled to the vessel and the supporting means for producing an electrical signal in response to movement of the vessel, which signal controls operation of the power means.

It is a more specific object of this invention to provide a system for loading and unloading articles from a floating vessel, which system may be conveniently used when articles are to be loaded upon or unloaded from a floating vessel and lowered from or raised to a stationary platform.

It is a still further specific object of this invention to provide means for mooring the vessel to be loaded or unloaded such that its movement is confined to that in a vertical direction.

Another and further specific object of this invention is to provide an electrical servo-mechanism arrangement for causing the synchronous movement between vessel and article supporting means in accordance with the objects hereinabove set forth.

Still another object of this invention is to provide an apparatus for loading and unloading articles from a floating vessel, which apparatus is easily and inexpensively manufactured, easily and inexpensively installed, not faulty in operation, and which requires installation of a minimum number of parts on vessels used.

Still other objects of this invention will become apparent to those of ordinary skill in the art by reference to the following detailed description of the exemplary embodiments of the apparatus. The various features of the exemplary embodiments may be best understood with reference to the accompanying drawings, wherein:

Figure 3 is a schematic diagram, partly in section, showing the various components of the apparatus of this invention, and the connections therebetween.

Figure 4 is a partially schematic wiring diagram showing a preferred embodiment of this invention for controlling synchronous movement between the vessel carrying articles to be loaded thereon or unloaded therefrom and the article supporting means for accomplishing such loading or unloading.

Figure 1:
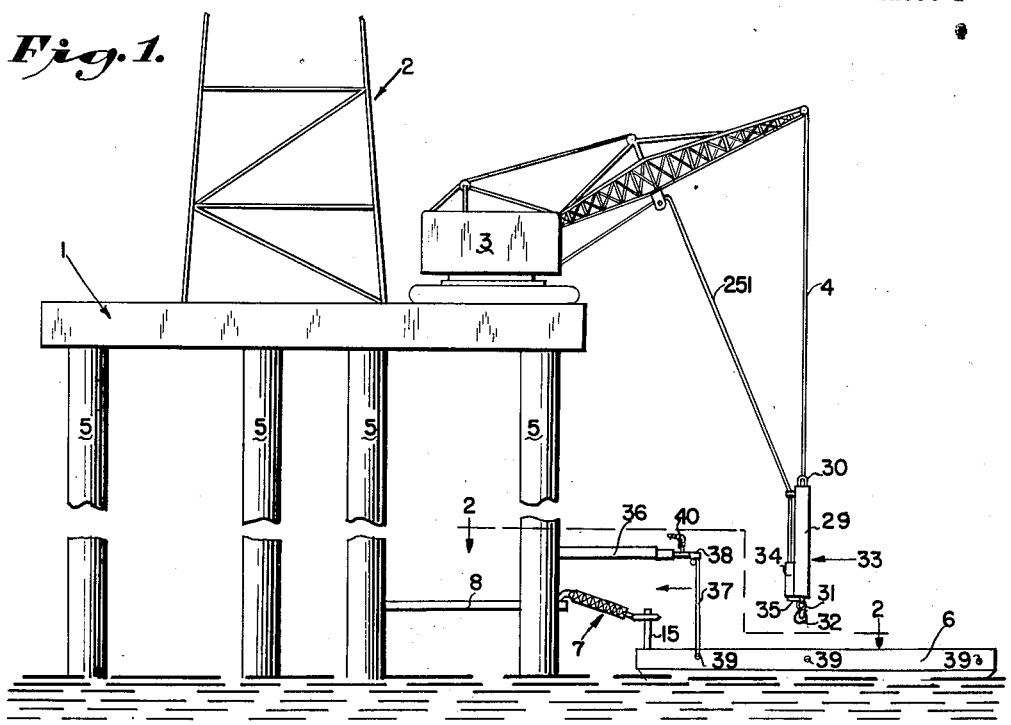
Figure 1 is a side view showing a vessel, in accordance with this invention, moored to an off-shore platform having a crane thereon, and showing the various parts of the apparatus of this invention disposed in exemplary operative positions.

In Figure 1, the numeral 1 generally designates an off-shore platform, such as for example, one which carries an oil drilling rig 2. Disposed on platform 1 is a crane 3 of any conventional design. The crane 3 has a cable 4 which can be raised or lowered by the crane power mechanism which may include a winch of conventional design. The platform 1 is supported by piles 5, and to one or more of these piles, a lower platform 8 is secured.

Figure 2:
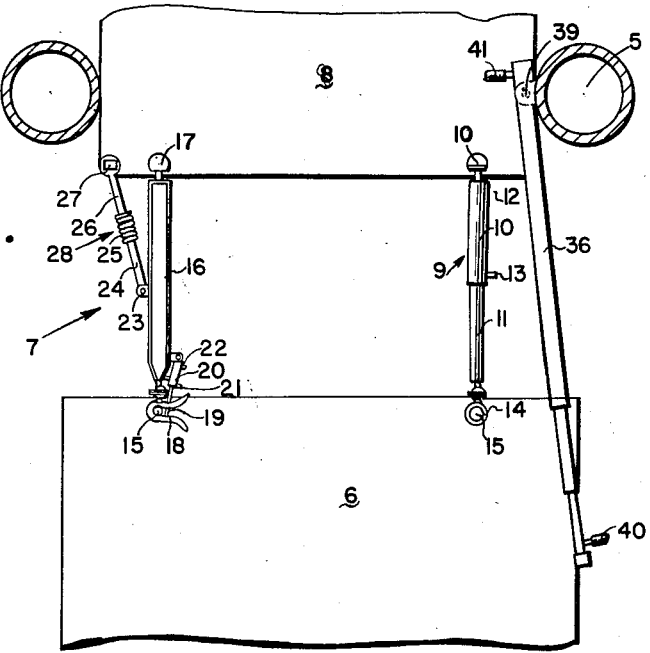
Figure 2 is an enlarged plan view of part of the apparatus shown in Figure 1 and taken along the line 2—2 of Figure 1.

To the platform 8, a floating vessel 6 is moored by a mooring means generally designated by the numeral 7. The preferred type of mooring means is best shown in Figure 2, wherein the numeral 9 designates a telescoping arm. Arm 9 is hingedly secured to platform 8 by means of hinge 10. The telescoping arm 9 comprises a hydraulically operated ram having a cylinder 10 and a piston with a piston rod 11. The numerals 12 and 13 designate connectors for connection with a fluid supply means in a manner referred to hereinafter in more detail with reference to Figure 3. Rod 11 carries at its exposed end a ring 14 for connection with a post 15 carried by vessel 6. The numeral 16 designates another arm which is part of the preferred mooring means. Arm 16 is secured at one end to platform 8 by means of a universal joint connection 17 which may be of the ball and socket type. At its other end, arm 16 carries a claw 18 which engages a second post 15 carried by vessel 6. Through claw 18 a hydraulically operated locking pin 19 extends. Pin 19 is the exposed extension of a piston rod depending from a piston housed in cylinder 20. The numerals 21 and 22 designate connectors for connection with a fluid supply means, which as pointed out hereinabove, will be referred to hereinafter. Pivotally secured to arm 16, as at 23, is a shock absorbing arrangement generally designated by 28, comprising arms 24 and 26 between the free ends of which is disposed an air snubber 25 of conventional design. Arm 24 is connected at pivot 23, to arm 16 while arm 26 is connected to platform 8 by a hinge 27 allowing for vertical movement only of the whole shock absorbing arrangement 28. It should be understood that mooring means 7 need not comprise the parts as shown in Figure 2 and described above although such is preferred, but may be any suitable mooring means which allows for movement of the vessel substantially in a vertical direction only.

Referring again to Figure 1, it will be noted that a cylinder 29 is carried by cable 4 and attached thereto by any suitable means such as an eye 30 extending from one end of cylinder 29. Extending from the other end of cylinder 29 is a piston rod 31 to which is attached a supporting means 32 in the form of a hook. The cylinder 29 and piston rod 31 are parts of a hydraulically operated ram 33 which is capable of moving supporting means 32 between two levels determined by the amount of vertical movement imparted to vessel 6 by waves. The crane 3 and cable 4 move supporting means 32 between a vessel loading and unloading position and a remote loading and unloading position, the remote loading and unloading position being as shown, the platform. Thus, ram 33 may be used for synchronizing purposes, while the crane is used for the long distance raising and lowering.

Attached to one side of cylinder 29 is an electrical signal generator 34, referred to in more detail hereinafter. A mechanical link 35 connects piston rod 31 with the signal generator 34.

A second signal generator 38 which will also be referred to in more detail hereinafter, is carried at one end of a telescoping arm 36, which may be, and is as shown, a three-stage telescoping arm of conventional design. The signal generator 38 is connected by means of a mechanical link, generally designated by 37, such as, for example, a rod of adjustable length, to the vessel. The rod is secured to the vessel as at a point 39 by any suitable means such as a hook which engages a suitably formed aperture in the end of the bar.

Arm 36, as best shown in Figure 2, is pivotally secured, as at 39 to one pile 5. Arm 36 carries connectors 40 and 41 for connection with a fluid supply means as will be described with particular reference to Figure 3.

In Figure 3 is shown the overall system of this invention, including both electrical and hydraulic components. As was pointed out hereinabove with reference to Figure 1, a mechanical link 37 couples vessel 6 to signal generator 38, and a mechanical link 35 couples piston rod 31 and thereby supporting means 32 to signal generator 34. Signal generators 34 and 38 are connected to a common ground potential by means of leads 42 and 43, respectively. Signals produced by signal generator 38 are fed through lead 45 into a comparison unit 44 of conventional design, and signals produced by signal generator 34 are fed through lead 46 to the comparison unit 44. In Figure 4, the details of construction of the preferred form of signal generators are presented schematically.

Unit 200 corresponds to one component of a polyphase self-synchronous type of a telemetering arrangement, and includes a polyphase stator winding 202 energized by the alternating polyphase current from source 204 when relay blades 206 are closed by current through winding 208. As illustrated, the polyphase stator may have three windings connected in delta so as to receive three-phase current from source 204. Of course, stator 202 may have a different number of windings, and may be connected in Y, is is well known in the art.

Source 204 preferably energizes stator 202 with three-phase current of a frequency of approximately 400 cycles, but any other suitable frequency may be employed. To obtain three-phase current, source 204 may be an alternator which is driven by a 60-cycle motor 210 connected via lines 212 to the conventional power supply available about the stationary platform 8. The self-synchronous unit 200 includes a rotor which has a winding 214. The position of the rotor winding 214 relative to the stator winding, determines the phase of the voltage induced in the rotor winding. That is, when rotor winding 214 has a given angular position relative to the stator winding 202, a predetermined phase voltage will be induced in the rotor winding 214, while small angular movement of the rotor in either direction, will cause a different phase voltage to be induced in winding 214.

Similarly connected to the three-phase supply 204 is a second polyphase self-synchronous type unit 216. This unit has a three-phase stator 218 which is connected in parallel with the stator winding 202 and to the source 204. In fact, the stator windings of both polyphase units are symmetrically connected to the three-phase currents of supply 204 so that the polyphase fields are of the same space and time phase relation, as is well known in the art. Associated with the self-synchronous unit 216 is a rotor which has a winding 220. This winding is inductively related to stator winding 218 in the same manner that the rotor and stator windings of unit 200 are related.

Each of the rotor windings 214 and 220 is connected at one end to ground reference potential, and at the other end to a comparison unit 44 in the form of a phase discriminating circuit which circuit may also have amplification properties. Rotation of each of the rotors within its respective stator will result in the development of an output potential across the terminals of the rotor winding. The output voltages so developed are concurrently fed to the input side of comparison unit 44. If the phase of the output signals from the rotor windings differs from a predetermined phase relationship, a signal will be present on one or the other of the output lines 224 or 226, line 228 being the common return line. However, when the output voltages developed across rotor windings 214, 220 have said predetermined phase relationship, there will be no control signals, or at least ineffective control signals on either of lines 224, 226. To obtain such "zero" outputs or control signals on both lines 224, 226 simultaneously, the output voltages from windings 214 and 220 may be of the same magnitude but out of phase by 180°.

This in effect produces a zero signal at comparison unit 44. Under such conditions the outputs from the rotor windings are such as to fully oppose each other and nullify any control action by comparison unit 44, so as to preclude effective signals on either of lines 224 or 226. At such time, the rotors are in a predetermined angular relationship which may be referred to as their "null" positions. It is to be understood that zero control signals may be concurrently obtained on lines 224, 226 when the rotors are in a null relation even if the output voltages from the rotor windings are not 180° out of phase, it being only necessary that the comparison unit 44 be so arranged that the desired result is obtained.

As the water upon which boat 6 rides, moves up and down, the mechanical connection 37 between the boat and polyphase unit 200 operates to rotate the stator in one direction for an upward movement of the boat and in the other direction for a downward movement of the boat. This causes a different angular relation between the rotor winding 214 and its stator winding 202, thereby providing different output voltages to comparison unit 44 from rotor winding 214. Movement of the boat upward or downward has no effect on the output voltage induced in rotor winding 220.

When the rotors are moved out of a relative null position by upward or downward movement of the boat, the phase relation between the two voltages then induced in rotor windings 214 and 220 will be different than the stated predetermined relation so as to cause comparison unit 44 to provide an output signal on one of lines 224, 226. For the sake of convenience, without limitation intended, it will be assumed that when the boat moves upward, a signal is produced on line 224, while when the boat moves downwardly, a signal is produced on line 226. In this manner, correspondence between the movement of the boat 6 and piston rod 31 to which the hook 32 is attached, is accomplished in the manner set forth hereinafter.

Referring again to Figure 3, it will be seen that leads 224, 226 and 228 connect with electromagnetic coils 71 and 72 which control positioning of shaft 74 which carries piston heads 75 and 76 of valve 73. The piston heads 75 and 76 are disposed within a valve cylinder 77 which is coupled to a fluid reservoir through lines 58 and 60. Valve cylinder 57 is also coupled to the reservoir through line 56, filter 55, line 54, safety pressure switch 53, line 52, accumulator 51, line 50, pump 49 and line 48. Thus, line 56 is a supply line carrying fluid under pressure by virtue of pump 49 while lines 58 and 60 are lines to return fluid to reservoir 47. Also coupled to valve cylinder 77 are lines 69 and 70 which connect to cylinder 29 above and below the piston head 31' housed within cylinder 29.

The coils 71 and 72 which control shaft 74 and thereby piston heads 75 and 76 are coupled to comparison unit 44 in the manner previously described and when a signal is produced on line 224 from an upward movement of boat 6, current traverses control coil 72 and returns to the phase comparison unit 44 via line 228. The current in coil 72 causes shaft 74 to move to the right in the valve cylinder 77 thereby positioning piston head 76 to the right of fluid line 69 so that fluid under pressure as it arrives on line 56 may proceed through the cylinder to line 69. Movement of the piston shaft 74 to the right places piston head 75 to the right of the fluid line 70 thereby allowing fluid in line 70 to proceed through the cylinder and out on the fluid return line 60. Fluid under pressure coming into cylinder 29, on line 69, enters cylinder 29 at the lower end thereof. This pushes the piston head 31' upwardly, causing fluid in the upper portion of the cylinder to exit via fluid return line 70. Since the piston head 31' is connected by piston rod 31 to hook 32, it is apparent that the hook is caused to move upwardly as boat 6 rises.

In order to stop the movement of piston rod 31 in its upward direction, the angular position of the rotor of self-synchronous unit 216 must be changed so that rotor windings 214 and 220 or the signals produced thereby, again come into a null relationship. This is accomplished by the coupling to piston rod 31 of a connecting elbow arm 35. Arm 35 is mechanically connected to the rotor of polyphase unit 216, so as to rotate the rotor of unit 216 again into a null position with the rotor of unit 200. The output voltages from rotor windings 214 and 220 will then effectively oppose and nullify each other in the discriminator 222. Springs 78 and 79 contained within cylinder 77 cause the piston heads 75 and 76 to move into alignment with lines 69 and 70 when no signal is sent to coil 71 or coil 72.

From the immediately preceding discussion, it will be apparent that after the vessel is moored in position, mechanical link 37 should be attached to boat 6 such that signal generator 38 is in null relation with signal generator 34. After such initial adjustment, the system is automatically in operative condition, and may be started in operation by closing switch 208 ¹ which causes current to flow through coil 208 and as a result causes blades 206 to close the three-phase circuit.

Movement of boat downwardly will cause operation of the circuitry of the control system in a manner similar to that described with reference to upward movement but in a reverse sense. That is, when the boat moves downwardly, the voltage induced across rotor winding 214, when compared with the voltage across rotor winding 220 in discriminator 44, will cause an output signal on line 226. Current traversing control coil 71 then causes piston rod 77 to move to the left so that the fluid incoming to the cylinder over line 56 will flow outwardly through line 70 to cylinder 29. The pressure on the top of piston head 31' in the hydraulic jack 29 moves the piston downwardly so as to cause the fluid in the lower portion thereof to exit on line 69 and pass through the valve cylinder 77 and return to reservoir 47 through line 58. Movement of the piston rod 31 downwardly also moves the arm 35 downwardly so that the resultant angular movement places the rotor of self-synchronous unit 216 back into a null position with that of unit 200, thereby causing the output voltages of the rotor windings to be again effectively opposed and nullified in comparison unit 44.

As in any servo system, particularly those with mechanical devices, there is a tendency for "overshoot." The inherent inertia of the fluid system, tends to cause the rotor of unit 216 to be driven further than it is desired. In order to dampen the effect of the system, a negative feedback signal is developed from the rate generator 80 of any well-known suitable type and is fed back over line 272 into the comparison unit 44. This negative feedback signal effectively opposes development of either of the signals developed on lines 224, 226 to a small degree so that the full effect of the difference between the phases of the voltages across rotor windings 214 and 220 when out of null relation, is lessened. The rotor of unit 216 is thereby prevented from rotating beyond its null position with the rotor of unit 200. With such dampening effect, any "hunting" action of the system is effectively eliminated.

The comparison unit 44 must develop a sufficient signal on lines 224, 226 to energize the coils, and therefore, the unit may have amplification properties. However, unit 44 may comprise a comparison system which feeds a separate power amplifier without traversing the scope of this invention.

The various components of the hydraulic system may be of any suitable type, however, it is preferable to use a reservoir of the open type with a fluid level gauge, a demand type pump with a full cut-in and cut-out characteristic of a fraction of a second, a bladder type accumulator, and a filter with a replaceable cartridge. The safety pressure switch 53 may be of any conventional design. It is coupled to coil 208 which controls blades 206, and is operative to short-circuit that coil, so that the power to the control valve 72 will be shut off should there be a sufficient diminution in the fluid pressure to activate the safety switch such as may be caused by a leak in a line.

By again referring to Figure 3, it will be noted that a series of valves 100, 105, and 110 are connected in parallel with valve 73 by lines 57, 64, 65, 57 ¹, 64 ¹, and 65 ¹. These valves are of the same construction as valve 73 and function in the same manner. Valve 100 controls arm 36. Double pole, double throw switch 103 connects battery 104 across coils 101 or 102 depending on the side to which the central switch blade is thrown, that is, depending on whether it is connected to line 101 ¹ or line 102 ¹. Similarly, valve 105 controls telescoping arm 9 and valve 110 controls the fluid passed to cylinder 20 for causing pin 19 to extend through claw 18 so as to lock post 15 in place.

By again referring to Figure 2, it will be seen that a vessel upon approaching the mooring means, would direct a post 15 carried on that vessel into claw 18. Switch 113 would then be closed to contact line 111 ¹ and fluid under pressure would be fed through connector 22 to cause pin 19 to project through claw 18. Switch 109 would then be depressed so that battery 108 was connected across either line 106 ¹ or line 107 ¹ depending on the direction in which it was desired to move piston arm 11 so that ring 14 could be placed around another post 15 carried by vessel 6. Switch 109 could then be operated to cause piston arm 11 to move in or out so as to properly position vessel 6. Switch 103 would then be depressed so as to connect battery 104 across line 101 ¹ or line 102 ² depending on in which direction one desired to move arm 36, and thereby position signal generator 38. As soon as positioned, the mechanical link 37 could be connected with vessel 6 at desired contact 39, the choice of contact depending on which part of the vessel it was desired to unload.

Valves 66, 67, and 81 in lines 57, 64, and 65 have been provided so that valve 73 may be isolated from valves 100, 105, and 110 after these latter valves have controlled proper positioning of arm 36, piston arm 9 and pin 19. Valves 61, 62, and 63 serve with valve 62 but to isolate valve 100, 105, and 110 from valves 73 when valves 100, 105, and 110 are operating.

It should be understood that suitable power may be supplied where necessary from any suitable source. It should also be understood that it is not necessary to use a phase comparison serve-system, as the comparison unit may be an amplitude control system, and the signal generator potentiometers suitably connected in a conventional manner and supplied by direct current or single phase alternating current.

Moreover, it should be understood that the various wires and hydraulic lines shown as connected with signal generator 34 and cylinder 29 may be placed within a single housing cable such as that designated by the numeral 251 in Figure 1.

From the foregoing, it is apparent that there is provided by their invention systems in which the various phases, objects and advantages herein set forth are successfully achieved.

Moreover, it will be appreciated that various modifications will become apparent to those of ordinary skill in the art after reading this disclosure. For example, the controlling ram 33 may be disposed within crane 3 and need not be carried by cable 4 although such is preferred.

Since various modifications, other than those suggested hereinabove, will become apparent after reading this disclosure, it is intended that when consideration is given to the appended claims, those claims be interpreted in an illustrative sense and not in a limiting sense.

What is claimed is:

1. A system for loading and unloading articles from a floating vessel, comprising supporting means for supporting said articles to be loaded and unloaded from said vessels; power means operable in response to an electrical signal for controlling movement of said supporting means when said supporting means is in a vessel loading and unloading position; a first electrical signal generator coupled to said vessel and controlled thereby in correspondence with the vertical position thereof; a second electrical signal generator coupled to said supporting means and controlled thereby in correspondence with the vertical position thereof; and means, in circuit connection with said signal generators and operative when said signals are not in a predetermined relationship, to produce an electrical signal to operate said power means and thereby cause said supporting means to move such that said signals return to said predetermined relationship.

2. A system for loading and unloading articles from a floating vessel, comprising supporting means for supporting said articles to be loaded and unloading from said vessel; power means operable in response to an electrical signal for controlling movement of said supporting means when said supporting means is in a vessel loading and unloading position; a first rotor winding coupled to said vessel and oriented thereby in correspondence with the vertical position thereof; a second rotor winding coupled to said supporting means and oriented thereby in correspondence with the vertical position thereof; a first polyphase stator winding in inductive relation with said first rotor winding; a second polyphase stator winding in inductive relation with said second rotor winding, said stator windings being symmetrically connected to a source of polyphase alternating current and said rotor windings being in electrically null relation when said vessel and said supporting means are in a predetermined vertical alignment; and means in circuit connection with said rotor windings and operable upon a relative displacement thereof from said null relation, when said vessel and said supporting means are out of said predetermined vertical alignment, to produce an electrical signal to operate said power means and thereby cause said supporting means to orient said second rotor winding such that there is no relative displacement between said first and said second rotor windings.

3. Apparatus for transferring articles between a floating vessel and a platform comprising mooring means for limiting the relative movement between said vessel and said platform substantially in a vertical direction, means for supporting said articles to be loaded and unloaded from said vessel, means for moving said supporting means between a vessel loading and unloading position and a remote platform loading and unloading position, electrical synchronizing means operable in response to the movement of said vessel in said vertical direction for synchronizing the related vertical movement of said supporting means when disposed in said vessel loading and unloading position, said synchronizing means including a pair of electrical signal generators coupled to said vessel and said supporting means for producing an electrical signal in response to the vertical movement of said vessel, and power means for effecting movement of said supporting means in response to an electrical signal from said servo-means to synchronize the vertical movement of said supporting means with the vertical movement of said vessel.

4. Apparatus for transferring articles between a floating vessel and a platform as defined in claim 3 wherein said mooring means comprises hydraulically operated clamping means detachably secured to said platform for limiting the movement of said vessel relative to said platform in a substantially vertical direction.

References Cited in the file of this patent

UNITED STATES PATENTS 2,854,154     Hepinstall _____ Sept. 30, 1958